United States Patent [19]

Zeiringer

[11] Patent Number: 4,643,983
[45] Date of Patent: Feb. 17, 1987

[54] METHOD OF PRODUCING A GRINDING MEDIUM

[76] Inventor: Hans Zeiringer, Passering, Neubau, A 9321 Kappel/Krappfeld, Austria

[21] Appl. No.: 757,899

[22] Filed: Jul. 23, 1985

[30] Foreign Application Priority Data

Aug. 1, 1984 [AT] Austria ................................ 2477/84

[51] Int. Cl.$^4$ ........................ C04B 35/56; C09C 1/68
[52] U.S. Cl. ..................................... 501/87; 501/127; 51/307; 51/309
[58] Field of Search ................... 501/87, 127; 51/307, 51/309

[56] References Cited

U.S. PATENT DOCUMENTS

| 2,886,454 | 5/1959 | Todd | 501/87 O |
| 3,792,553 | 2/1974 | Schleifer et al. | 51/309 O |
| 3,916,583 | 11/1975 | Rowse et al. | 51/309 X |
| 4,059,417 | 11/1977 | Ilmaier et al. | 51/309 O |
| 4,252,544 | 2/1981 | Takahashi | 501/127 X |
| 4,341,533 | 7/1982 | Daire et al. | 501/87 X |

Primary Examiner—William R. Dixon, Jr.
Assistant Examiner—Karl Group
Attorney, Agent, or Firm—Kurt Kelman

[57] ABSTRACT

A method of producing a grinding medium on the basis of alpha-alumina and at least one alumina carbide selected from the group consisting of $Al_2OC$ and $Al_4O_4C$ comprises the steps of melting a mixture of alumina or a material rich in alumina with a carbon-containing reducing agent to obtain a melt, rapidly cooling the melt to obtain a solidified body, breaking the solidified body into abrasive grains, and subjecting the abrasive grains to a heat treatment at a temperature of 500° C. and 1500° C. for a period of three minutes to 24 hours.

13 Claims, No Drawings

METHOD OF PRODUCING A GRINDING MEDIUM

The present invention relates to a method of producing a grinding medium on the basis of alpha-alumina and at least one aluminum carbide, optionally comprising at least one additive.

U.S. Pat. No. 4,341,533 discloses a grinding medium comprised of a combination of a crystalline phase of aluminum oxide and at least one aluminum carbide selected from the group consisting of $Al_2OC$ and $Al_4O_4C$, wherein the component proportions are such that, in the phase diagram, $Al_2O_3 + Al_4C_3$ corresponds to a mol fraction of $Al_4C_3$ between 0.02 and 0.20. The molten mixture is cooled at a controlled speed of 10° C. to more than 100° C. per minute. The cooled melt is then broken up into grains in a conventional manner, classified and used for abrading materials.

It has now been found that the proportion of $Al_4C_3$ in the end product increases considerably with an increasing content of carbon in the melt if the mixture of alumina or alumina-rich materials with a carbon-containing reduction agent is molten and then rapidly cooled. Since $Al_4C_3$ is decomposed in a humid ambiance and by heat during grinding, the efficiency of the grinding medium is considerably reduced by the presence of $Al_4C_3$.

It is an object of this invention to avoid this disadvantage by melting a mixture of a raw material selected from the group consisting of alumina and a material rich in alumina with a carbon-containing reducing agent to obtain a melt, rapidly cooling the melt to obtain a solidified body, breaking the solidified body into abrasive grains, and subjecting the abrasive grains to a heat treatment at a temperature of between 500° C. and 1500° C. for a period of three minutes to 24 hours. The mixture may further comprise a metallic reducing agent, preferably magnesium or aluminum. At least one additive, for example selected from the group consisting of magnesium, calcium, zirconium, titanium, silicon, chromium and a rare earth may be added to the mixture, preferably in an amount of 0.1% to 10%, by weight. The grinding grains may be surface-coated before or after the heat treatment with at least one substance selected from the group consisting of silicates, pulverulent corundum, pigments and iron oxides.

The controlled heat treatment has the purpose of removing the unwanted $Al_4C_3$ and to change the structure of the grinding material into a special metastable equilibrium to relieve the internal tensions and lattice deformations (the rapid cooling of the melt resulting in an extreme unbalance in the structure.

The rapid cooling of the melt, involving a cooling time of more than 100° C./min., is absolutely necessary since it assures the formation of a suitable microcrystalline structure required for excellent grinding efficiency, in addition to the composition of the structure. A slower cooling of the melt in the range of 50° C./min., for example, produces a grinding medium containing alpha-alumina and the two oxide carbide phases $Al_2OC$ and $Al_4O_4C$ but the grinding efficiency is unsatisfactory because of the coarse crystalline structure of the product.

The rapid cooling of the melt may be accomplished by casting it in a mold with defined plate distances, by casting on a metallic or non-metallic shaped body or in a salt or metal melt.

Too long an annealing or an annealing process at excessively high temperatures leads to a substantial equilibrium in the structure, i.e. to the disappearance of the $Al_2OC$-phase, which has a negative effect on the grinding efficiency, as the following examples will clearly show.

The properties of the grinding medium obtained by the process of the invention have been further improved by the addition of the above-mentioned additives in the preferred indicated amounts.

It has furthermore been found that optimal grinding efficiencies are obtained if the grinding medium contains $Al_2OC$ and $Al_4O_4C$, the proportion of the $Al_2OC$-phase preferably exceeding that of the $Al_4O_4C$-phase.

The carbon-containing reducing agent may be selected from the group consisting of coke, carbon black, graphite, anthrazite and amorphous carbon, or it may be a carbide, such as $Al_4C_3$ added, for example, to obtain an amount of less than 5%, preferably less than 0.5%, by weight, in the end product.

The indicated surface coatings, which are applied before or after the annealing heat treatment, depending on the coating substance, further improve the outstanding qualities of the grinding medium of the present invention. The purpose of the coating is the creation of an enlarged grain surface, which decisively improves the bonding of the grinding medium to the grinding tool.

The grain tenacity (grain decomposition) and the grinding properties of the grinding medium produced according to this invention were determined on the basis of grain P36 FEPA-norm (Federation Europeene des Frabricants de Produits Abrasifs) to determine the grinding efficiency.

To determine the grinding efficiency, grain fraction 36 was bonded with a synthetic resin adhesive to a substrate web. The grinding efficiency (material removal per unit of time) was then determined by grinding a carbon C45 steel shaft under constant pressure with a band grinding machine, as compared to grinding with a zirconium-containing corundum of eutectic composition whose melt had been cooled under the same conditions. An index of 100 was arbitrarily selected for the grinding efficiency of the Zr-containing grinding medium produced by casting the melt in an iron mold having a plate distance of 5 to 7 mm.

The grain tenacity (grain decomposition) was determined by the following method:

A screwed-together steel cylinder containing 12 steel balls having a diameter of 19 mm was filled with 50 grams of grain fraction 36 having a defined mesh size. The closed cylinder was then turned for 10 minutes at a constant rotational speed on a roller frame unit and the resultant grains were then subjected to a new mesh size analysis. The grain decomposition is obtained by the proportion of the average grain size before and after milling, according to the formula % Grain decomposition = 100.average grain size after milling/average grain size before milling Since the grain decomposition depends not only on the specific material properties but also in the shape of the grains, the resultant values were corrected by a grain shape factor.

The invention will now be further explained in connection with the following specific examples:

EXAMPLE 1 (COMPARATIVE EXAMPLE)

A mixture of 150 kg of calcined argillaceous earth (pure clay) containing 0.35%, by weight, of $Na_2O$ and 0.6 kg of milled coke (C) was melted in an electric arc furnace. The melt was then cast in a mold with a plate distance of 5–7 mm. The solidified plate-shaped body contained 0.045%, by weight, of C and 0.03%, by weight, of $Na_2O$. The material was milled in a commercially available comminuting installation and classified according to FEPA-norms into grinding grains. Grain 36 was subjected for 10 minutes to a heat treatment at 1200° C. to relieve internal tensions and oxidize any carbides that may have been present.

The test results of the thus annealed and non-annealed abrasive grains as well as of the comparative grains of Zr-corundum are given hereinbelow in Table 1.

TABLE 1

|  | Weight % decomposition | Efficiency Index |
|---|---|---|
| Eutectic Zr-corundum | 38.2 | 100 |
| Non-annealed grain 36 (Ex. 1) | 48.7 | 49.1 |
| Annealed grain 36 (Ex. 1) | 41.5 | 65.0 |

The X-ray structural micro-analysis (hereinafter termed RDA) of the material showed that the annealed as well as the non-annealed material consisted exclusively of alpha-alumina, within the established limits of proof.

The following Examples 2–6 proceeded essentially under the same conditions as Example 1. The sole changes were made in the reducing agent and the type of heat treatment used (Example 7).

EXAMPLE 2

The reducing agent was 3.5 kg of milled cokes. The solidified plate-shaped material contained 0.4%, by weight, of C and 0.03%, by weight, of $Na_2O$. The RDA showed the material to consist primarily of alpha-alumina, with a small amount of $Al_2OC$. No $Al_4C_3$ was found.

EXAMPLE 3

Eight kg of milled coke was used as reducing agent. The product was found to contain 1.1%, by weight, of C and less than 0.02%, by weight, of $Na_2O$. The RDA showed the material to consist primarily of alpha-alumina and $Al_2OC$, with minor amounts of $Al_4O_4C$ and $Al_4C_3$.

EXAMPLE 4

Ten kg of milled coke was used as reducing agent and the resultant product has a C content of 1.4%, by weight, and an $Na_2O$ content of less than 0.02%, by weight. The RDA showed the material to consist primarily of alpha-alumina, $Al_2OC$ and $Al_4O_4C$, the amount of $Al_4C_3$ in the material being substantially more than in that of Example 3 and comprising 2–3%, by weight.

EXAMPLE 5

Sixteen kg of milled coke were used as reducing agent and the product contained 2.4%, by weight, of C and less than 0.02%, by weight, of $Na_2O$. When the furnace charge was melted, volatilization of aluminum was clearly noticed. In addition, the melt foamed considerably so that the furnace charge had to be briquetted to avoid excessive dusting.

The RDA showed a product consisting of alpha-alumina, $Al_2OC$ and $Al_4O_4C$, additionally containing about 4–5%, by weight, of $Al_4C_3$.

EXAMPLE 6

In this case, too, the furnace charge comprised of 150 kg of calcined argillaceous earth (pure clay) and 25 kg of milled coke (C) was briquetted. When the bricks were melted, a substantial amount of the aluminum was volatilized and, furthermore, the melt foamed considerably. The product cast in the mold contained 4.5%, by weight, of C and the $Na_2O$-content was below 0.02%, by weight. The RDA showed a large amount of $Al_2OC$ and $Al_4O_4C$ in addition to alpha-alumina and a 10%, by weight, content of $Al_4C_3$.

EXAMPLE 7

The grains obtained by the processes of Examples 2 to 6 and classified were subjected to an annealing heat treatment to remove any $Al_4C_3$, to alleviate internal tensions and to adjust to a specific metastable equilibrium in the structure. The annealing temperatures were 1000° C., 1100° C., 1200° C., 1300° C., 1500° C. and 1800° C. and the annealing times were 3, 5, 10, 20, 40, 60, 120 and 240 minutes. Since the heat treatment was designed solely to oxidize the carbide to respective oxide carbides, annealing beyond 10 minutes was effected in a controlled atmosphere (primarily an inert atmosphere). It was desired to keep the carbon content after the heat treatment not substantially lower than before the treatment.

The examination of the products was carried out in the above-indicated manner and the test results are shown in Table 2.

TABLE 2

| Ex. No. | °C. | Treatment time/min. | Grain decomposition %, by wt. | Grinding efficiency index |
|---|---|---|---|---|
| 2 | not annealed | — | 45.0 | 49.8 |
| " | 1000 | 3 | 45.0 | 50.2 |
| " |  | 10 | 41.3 | 60.2 |
| " |  | 20 | 41.1 | 65.8 |
| " |  | 40 | 40.8 | 60.3 |
| " |  | 120 | 42.8 | 51.2 |
| " | 1100 | 3 | 44.8 | 54.6 |
| " |  | 10 | 39.8 | 65.4 |
| " |  | 20 | 42.8 | 65.1 |
| " |  | 40 | 44.5 | 68.2 |
| " |  | 120 | 45.8 | 51.5 |
| " |  | 240 | 46.3 | 50.8 |
| " | 1200 | 5 | 40.8 | 58.4 |
| " |  | 10 | 39.3 | 67.5 |
| " |  | 20 | 39.8 | 67.3 |
| " |  | 40 | 43.5 | 58.1 |
| " |  | 60 | 44.9 | 51.1 |
| " |  | 240 | 48.0 | 47.1 |
| " | 1300 | 3 | 41.8 | 59.5 |
| " |  | 5 | 39.9 | 64.5 |
| " |  | 10 | 41.5 | 62.7 |
| " |  | 20 | 43.8 | 59.1 |
| " |  | 40 | 45.5 | 50.6 |
| " |  | 240 | 48.5 | 46.5 |
| " | 1400 | 3 | 39.2 | 63.5 |
| " |  | 10 | 43.5 | 58.2 |
| " |  | 60 | 48.1 | 46.5 |
| " |  | 240 | 48.2 | 46.4 |
| 2 | 1500 | 3 | 45.3 | 52.5 |
| " |  | 5 | 44.6 | 52.5 |
| " |  | 20 | 48.6 | 44.6 |
| " |  | 60 | 51.2 | 41.2 |
| " |  | 240 | 51.8 | 41.0 |
| " | 1800 | 3 | 47.2 | 50.3 |
| " |  | 5 | 46.5 | 51.0 |

TABLE 2-continued

| Ex. No. | °C. | Treatment time/min. | Grain decomposition %, by wt. | Grinding efficiency index |
|---|---|---|---|---|
| " |  | 10 | 50.3 | 47.6 |
| " |  | 60 | 55.8 | 40.1 |
| " |  | 240 | 56.1 | 40.0 |
| 3 | not annealed |  | 41.2 | 66.3 |
| " | 1000 | 3 | 41.3 | 67.1 |
| " |  | 5 | 40.8 | 69.4 |
| " |  | 10 | 39.1 | 78.2 |
| " |  | 15 | 38.5 | 95.4 |
| " |  | 20 | 37.8 | 102.3 |
| " |  | 40 | 37.8 | 100.1 |
| " |  | 60 | 38.9 | 91.4 |
| " |  | 120 | 41.5 | 68.3 |
| " |  | 240 | 42.3 | 60.5 |
| " | 1100 | 5 | 39.4 | 81.2 |
| " |  | 10 | 37.8 | 98.5 |
| " |  | 20 | 37.2 | 103.2 |
| " |  | 40 | 38.5 | 95.8 |
| " |  | 120 | 43.5 | 60.2 |
| " | 1200 | 5 | 37.6 | 90.3 |
| " |  | 10 | 37.0 | 100.5 |
| " |  | 20 | 36.8 | 105.6 |
| " |  | 40 | 38.8 | 88.3 |
| " |  | 120 | 42.3 | 61.7 |
| " | 1300 | 3 | 40.5 | 78.6 |
| " |  | 5 | 36.5 | 104.3 |
| " |  | 10 | 35.8 | 106.2 |
| " |  | 20 | 37.3 | 100.8 |
| " |  | 40 | 39.8 | 81.4 |
| " |  | 120 | 42.1 | 60.2 |
| 3 | 1500 | 3 | 41.6 | 88.4 |
| " |  | 5 | 40.3 | 98.1 |
| " |  | 10 | 42.8 | 87.3 |
| " |  | 40 | 45.8 | 61.4 |
| " |  | 120 | 52.5 | 54.3 |
| " | 1800 | 3 | 43.5 | 67.3 |
| " |  | 20 | 52.5 | 45.1 |
| " |  | 240 | 58.3 | 39.5 |
| " | not annealed |  | 37.4 | 95.3 |
| 4 | 1000 | 5 | 35.4 | 104.5 |
| " |  | 10 | 34.6 | 106.3 |
| " |  | 20 | 34.3 | 108.5 |
| " |  | 40 | 35.8 | 106.3 |
| " |  | 60 | 38.9 | 97.2 |
| " |  | 240 | 43.0 | 71.3 |
| " | 1100 | 3 | 37.0 | 100.3 |
| " |  | 5 | 34.6 | 107.3 |
| " |  | 10 | 33.9 | 118.5 |
| " |  | 20 | 34.3 | 109.4 |
| " |  | 60 | 45.6 | 60.3 |
| " | 1200 | 3 | 35.8 | 102.6 |
| " |  | 5 | 33.9 | 114.8 |
| " |  | 10 | 32.4 | 130.3 |
| " |  | 20 | 35.9 | 104.6 |
| " |  | 40 | 39.9 | 90.5 |
| " |  | 240 | 56.1 | 41.3 |
| " | 1300 | 3 | 34.5 | 108.5 |
| " |  | 5 | 32.6 | 127.8 |
| " |  | 10 | 32.8 | 129.3 |
| " |  | 20 | 36.3 | 100.4 |
| " |  | 60 | 51.9 | 49.6 |
| " | 1500 | 3 | 36.5 | 105.2 |
| " |  | 5 | 43.2 | 78.5 |
| " |  | 40 | 58.6 | 44.6 |
| 4 | 1800 | 3 | 44.3 | 60.5 |
| " |  | 5 | 51.6 | 52.3 |
| " |  | 10 | 60.4 | 40.6 |
| " |  | 120 | 60.8 | 40.3 |
| 5 | not annealed |  | 35.8 | 105.6 |
| " | 1000 | 3 | 35.2 | 109.6 |
| " |  | 5 | 34.0 | 115.5 |
| " |  | 10 | 33.2 | 118.5 |
| " |  | 20 | 33.0 | 128.6 |
| " |  | 40 | 34.5 | 114.0 |
| " |  | 60 | 35.8 | 108.6 |
| " |  | 240 | 41.5 | 85.9 |
| " | 1100 | 3 | 35.1 | 108.2 |
| " |  | 5 | 33.6 | 118.4 |
| " |  | 10 | 32.9 | 129.6 |
| " |  | 20 | 32.5 | 136.3 |
| " |  | 40 | 36.8 | 105.2 |
| " |  | 240 | 55.6 | 45.8 |
| " | 1200 | 3 | 35.2 | 109.5 |
| " |  | 5 | 32.8 | 132.3 |
| " |  | 10 | 32.4 | 145.6 |
| " |  | 20 | 34.3 | 117.6 |
| " |  | 40 | 38.5 | 100.6 |
| " |  | 240 | 56.3 | 53.0 |
| " | 1300 | 3 | 34.6 | 112.5 |
| " |  | 5 | 32.6 | 140.6 |
| " |  | 10 | 33.8 | 120.3 |
| " |  | 20 | 37.2 | 100.5 |
| " |  | 120 | 54.6 | 51.3 |
| " | 1500 | 3 | 34.8 | 110.5 |
| " |  | 5 | 40.2 | 98.3 |
| " |  | 20 | 53.5 | 55.3 |
| " |  | 240 | 61.5 | 40.5 |
| " | 1800 | 3 | 48.6 | 61.3 |
| " |  | 40 | 61.3 | 39.8 |
| " |  | 240 | 60.3 | 39.4 |
| 6 | not annealed |  | 37.0 | 93.2 |
| " | 1000 | 3 | 36.1 | 104.6 |
| " |  | 10 | 34.5 | 111.4 |
| " |  | 20 | 33.8 | 111.0 |
| " |  | 40 | 35.8 | 105.4 |
| " |  | 60 | 41.3 | 90.6 |
| " |  | 240 | 48.7 | 65.3 |
| " | 1100 | 3 | 35.3 | 108.4 |
| " |  | 10 | 33.4 | 119.5 |
| " |  | 20 | 35.6 | 108.3 |
| " |  | 40 | 38.2 | 101.4 |
| " |  | 240 | 50.2 | 55.0 |
| " | 1200 | 3 | 34.8 | 112.3 |
| " |  | 5 | 33.5 | 118.4 |
| " |  | 10 | 33.2 | 118.6 |
| " |  | 20 | 38.5 | 103.6 |
| " |  | 240 | 55.4 | 48.3 |
| " | 1300 | 3 | 34.2 | 117.3 |
| " |  | 5 | 34.0 | 119.2 |
| " |  | 10 | 35.4 | 109.6 |
| " |  | 20 | 40.3 | 98.4 |
| " |  | 60 | 48.3 | 61.4 |
| " | 1500 | 3 | 39.2 | 100.8 |
| " |  | 5 | 40.0 | 96.4 |
| " |  | 40 | 60.5 | 44.6 |
| " |  | 240 | 71.0 | 28.0 |
| " | 1800 | 3 | 51.5 | 50.6 |
| " |  | 40 | 68.3 | 38.7 |
| " |  | 240 | 72.3 | 28.3 |

The RDA of the annealed products showed that no $Al_4C_3$ could be found after, for example, an annealing heat treatment of 10 minutes at a temperature of 1200° C. If the temperature was lower, the heat treatment time had to be correspondingly extended while it was shortened as the temperature was increased. At the same time that the carbides were oxidized, the proportion of the $Al_2OC$-phase was changed, i.e. it was somewhat reduced in favor of the $Al_4O_4C$-phase.

EXAMPLE 8 (COMPARATIVE EXAMPLE)

A mixture comprised of 150 kg of calcined argillaceous earth (pure clay) containing 0.35%, by weight, of $Na_2O$, 1.5 kg of MgO and 0.6 kg of milled coke was melted in an electric arc furnace in the same manner as in Example 1. The melt was cast in a mold with a plate distance of 5–7 mm. The solidified material had a carbon content of 0.05%, by weight, an MgO-content of 1.03%, by weight, and an $Na_2O$-content of 0.03%, by weight. It was milled, classified and annealed at a temperature of 1200° C. for 10 minutes. The examination of the grain properties of grain P 36 (FEPA-norma) was carried out in the above-described manner and the test results are given in Table 3.

TABLE 3

| | Wt. % grain decomposition | Grinding efficiency index |
|---|---|---|
| Grain P 36 (Ex. 8) not annealed | 45.8 | 55.8 |
| Grain P 36 (Ex. 8) annealed | 40.2 | 71.3 |

The RDA showed the material to consist of alpha-alumina and $MgO.13Al_2O_3$. No significant phase changes occurred in the heat treatment.

The treatment conditions in the following Examples 9 to 15 were essentially the same as in Examples 1-8. The changes relate to the reducing agent, the MgO-additive and the manner of the annealing heat treatment, which is described in Example 16.

EXAMPLE 9

A mixture of 150 kg of calcined argillaceous earth (pure clay), 1.5 kg of MgO and 6.0 kg of milled coke (C) was melted in an electric arc furnace. The solidified product contained, by weight, 0.8% C, 1.08% MgO and less than 0.02% $M_x2O$. The RDA showed the material to be comprised of alpha-alumina and the compounds $MgO.13Al_2O_3$, Mg-O-Al and $Al_2OC$. The $Al_4C_3$-content was below provable limits.

EXAMPLE 10

One hundred and fifty kilogram of calcined argillaceous earth (pure clay), 1.5 kg of MgO and 13 kg of milled coke were thoroughly mixed, bricketted and melted in an electric arc furnace. The product contained, by weight, 2.0% C, 1.1% MgO and less than 0.02% $Na_2O$. The RDA showed the product to be comprised primarily of alpha-alumina, $MgO.13Al_2O_3$, $Al_2OC$, $Al_4O_4C$ and about 3-4%, by weight, of $Al_4C_3$.

EXAMPLE 11

A briketted mixture of 150 kg of calcined argillaceous earth (pure clay), 1.5 kg of MgO and 20 kg of milled coke (C) was melted in an electric arc furnace. The product solidified in a mold contained, by weight, 3.1% C, 1.1% MgO and less than 0.02% $M_x2O$. The RDA showed the material to be comprised of alpha-alumina and the compounds $MgO.13Al_2O_3$, $Al_2OC$, $Al_4O_4C$ and 8%, by weight, of $Al_4C_3$.

EXAMPLE 12

A mixture of 150 kg of calcined argillaceous earth (pure clay), 3.0 kg of MgO and 0.6 kg of milled coke (C) was melted and cast in the manner described in Example 1. The product contained, by weight, 0.05% C, 1.95% MgO and 0.03% $Na_2O$. The RDA showed the prevailing phases to consist of alpha-alumina and $MgO.13Al_2O_3$, with some Mg-Al-O. No carbides were found.

EXAMPLE 13

One hundred and fifty kilogram of calcined argillaceous earth (pure clay), 3.0 kg of MgO and 13 kg of milled coke were mixed and the mixture was bricketted. After melting and casting in a mold, the product contained, by weight, 1.96% C, 2.04% MgO and less than 0.02% $Na_2O$. According to the RDA, the material was comprised of alpha-alumina, $MgO.13Al_2O_3$, $Al_2OC$, $Al_4O_4C$ and 4-5%, by weight, of $Al_4C_3$.

EXAMPLE 14

One hundred and fifty kilogram of calcined argillaceous earth (pure clay), 5.4 kg of MgO and 0.6 kg of milled coke were thoroughly mixed and melted in an electric arc furnace. The melt was cast in a mold with a plate distance of 5-7 mm. The solidified product contained, by weight, 0.045% C, 3.48% MgO and 0.04% $Na_2O$. The RDA showed the product to be comprised of alpha-alumina, $MgO.13Al_2O_3$, a little Mg-Al-O and spinel.

EXAMPLE 15

A mixture of 150 kg of calcined argillaceous earth (pure clay), 5.4 kg of MgO and 13 kg of milled coke (C) was bricketted and melted and cast in the manner described in Example 1. The product contained, by weight, 1.94% C, 3.55% MgO and less than 0.02% $Na_2O$. The RDA showed the material to be comprised of alpha-alumina, $MgO.13Al_2O_3$, Mg-Al-O and the oxycarbides $Al_2OC$ and $Al_4O_4C$, in addition to 5%, by weight, of $Al_4C_3$.

EXAMPLE 16

Analogous to Example 7, the classified grains obtained in Examples 9 to 15 were subjected to an annealing heat treatment. The materials of Examples 12 and 14 were heated for 10 minutes at a temperature of 1200° C. since they required no oxidation of carbides. All other products were treated at different temperatures for different lengths of time.

The test results derived from grains P 36 (FEPA) of Examples 9-15 are shown in Table 4.

TABLE 4

| Ex. No. | °C. | Treatment time/min. | Grain decomposition %, by wt. | Grinding efficiency index |
|---|---|---|---|---|
| 9 | not annealed | — | 42.9 | 65.3 |
| " | 1000 | 3 | 42.8 | 64.5 |
| " | | 5 | 39.5 | 89.3 |
| " | | 10 | 36.8 | 109.3 |
| " | | 20 | 35.2 | 111.5 |
| " | | 40 | 34.8 | 113.2 |
| " | | 60 | 37.5 | 105.3 |
| " | | 120 | 39.6 | 92.5 |
| " | | 240 | 40.2 | 90.6 |
| " | 1100 | 3 | 42.5 | 65.3 |
| " | | 5 | 38.6 | 96.4 |
| " | | 10 | 35.2 | 115.6 |
| " | | 20 | 34.5 | 120.1 |
| " | | 40 | 36.3 | 112.3 |
| " | | 60 | 38.5 | 100.3 |
| " | | 240 | 44.4 | 68.3 |
| " | 1200 | 3 | 41.6 | 77.3 |
| " | | 5 | 37.8 | 103.2 |
| " | | 10 | 34.0 | 125.4 |
| " | | 20 | 33.3 | 131.2 |
| " | | 40 | 38.4 | 101.6 |
| " | | 60 | 41.5 | 81.3 |
| " | 1300 | 3 | 40.2 | 99.5 |
| " | | 5 | 35.3 | 113.2 |
| " | | 10 | 33.6 | 129.7 |
| " | | 20 | 37.5 | 102.6 |
| 9 | 1300 | 40 | 40.3 | 91.5 |
| " | | 60 | 43.1 | 70.6 |
| " | | 240 | 44.6 | 59.8 |
| " | 1500 | 3 | 38.4 | 100.5 |
| " | | 5 | 38.6 | 100.3 |
| " | | 10 | 39.3 | 95.4 |
| " | | 20 | 41.2 | 80.3 |
| " | | 60 | 44.6 | 60.5 |
| " | 1800 | 3 | 40.3 | 91.2 |
| " | | 5 | 41.5 | 80.4 |
| " | | 10 | 42.6 | 64.3 |
| " | | 240 | 45.3 | 55.0 |

TABLE 4-continued

| Ex. No. | °C. | Treatment time/min. | Grain decomposition %, by wt. | Grinding efficiency index |
|---|---|---|---|---|
| 10 | not annealed | | 37.5 | 102.3 |
| " | 1000 | 3 | 36.7 | 109.9 |
| " | | 5 | 35.2 | 118.6 |
| " | | 10 | 33.0 | 132.6 |
| " | | 20 | 32.3 | 150.5 |
| " | | 40 | 32.5 | 150.5 |
| " | | 60 | 34.7 | 118.6 |
| " | | 120 | 40.8 | 100.3 |
| " | 1100 | 3 | 35.0 | 117.6 |
| " | | 5 | 33.3 | 129.4 |
| " | | 10 | 32.0 | 151.3 |
| " | | 20 | 31.0 | 153.6 |
| " | | 40 | 34.1 | 122.5 |
| " | | 60 | 36.3 | 113.1 |
| " | | 120 | 38.3 | 100.6 |
| " | 1200 | 3 | 35.1 | 118.3 |
| " | | 5 | 32.0 | 154.6 |
| " | | 10 | 31.4 | 160.2 |
| " | | 20 | 31.0 | 171.3 |
| " | | 40 | 35.3 | 120.6 |
| " | | 120 | 44.6 | 67.5 |
| 10 | 1300 | 3 | 34.8 | 114.6 |
| " | | 5 | 32.0 | 151.8 |
| " | | 10 | 32.3 | 148.5 |
| " | | 20 | 32.8 | 138.4 |
| " | | 40 | 36.5 | 110.6 |
| " | | 60 | 42.6 | 67.3 |
| " | 1500 | 3 | 34.5 | 115.3 |
| " | | 5 | 37.2 | 108.5 |
| " | | 40 | 48.3 | 51.3 |
| " | | 240 | 54.1 | 45.8 |
| " | 1800 | 3 | 36.3 | 111.5 |
| " | | 5 | 44.3 | 70.8 |
| " | | 20 | 50.4 | 50.6 |
| " | | 120 | 54.8 | 45.6 |
| 11 | not annealed | | 36.4 | 108.4 |
| " | 1000 | 3 | 36.4 | 110.6 |
| " | | 5 | 34.8 | 120.5 |
| " | | 10 | 33.2 | 128.4 |
| " | | 20 | 33.0 | 130.6 |
| " | | 40 | 38.5 | 105.4 |
| " | | 60 | 39.8 | 100.6 |
| " | | 240 | 41.3 | 90.2 |
| " | 1100 | 3 | 35.2 | 117.4 |
| " | | 5 | 33.0 | 126.5 |
| " | | 10 | 32.8 | 140.8 |
| " | | 20 | 32.1 | 145.6 |
| " | | 40 | 35.8 | 115.3 |
| " | | 60 | 39.9 | 100.3 |
| " | | 240 | 48.6 | 50.3 |
| " | 1200 | 3 | 35.3 | 117.9 |
| " | | 5 | 32.8 | 138.8 |
| " | | 10 | 32.0 | 159.6 |
| " | | 20 | 32.3 | 141.8 |
| " | | 40 | 39.6 | 102.5 |
| " | | 60 | 45.2 | 80.3 |
| 11 | 1300 | 3 | 33.8 | 125.6 |
| " | | 5 | 32.4 | 141.5 |
| " | | 10 | 32.8 | 137.9 |
| " | | 20 | 37.0 | 108.5 |
| " | | 40 | 43.5 | 76.2 |
| " | | 120 | 55.3 | 48.6 |
| " | 1500 | 3 | 34.2 | 118.5 |
| " | | 5 | 38.6 | 101.2 |
| " | | 20 | 48.3 | 50.6 |
| " | | 240 | 61.3 | 42.3 |
| " | 1800 | 3 | 41.6 | 85.7 |
| " | | 10 | 51.3 | 50.6 |
| " | | 240 | 66.8 | 42.0 |
| 12 | not annealed | | 43.2 | 65.8 |
| " | 1200 | 10 | 41.1 | 68.5 |
| 13 | not annealed | | 38.7 | 100.3 |
| " | 1000 | 3 | 38.5 | 100.4 |
| " | | 10 | 35.8 | 116.5 |
| " | | 20 | 34.3 | 128.4 |
| " | | 40 | 34.0 | 130.0 |
| " | | 60 | 36.0 | 110.2 |
| " | | 120 | 38.2 | 101.4 |
| " | 1100 | 3 | 36.7 | 108.4 |
| " | | 5 | 35.3 | 119.6 |
| " | | 10 | 34.7 | 125.4 |
| " | | 20 | 33.9 | 135.6 |
| " | | 40 | 35.0 | 121.6 |
| " | | 60 | 38.4 | 101.4 |
| " | | 240 | 50.3 | 67.6 |
| " | 1200 | 3 | 36.3 | 112.3 |
| " | | 5 | 34.5 | 121.6 |
| " | | 10 | 33.5 | 137.6 |
| " | | 20 | 33.4 | 145.2 |
| " | | 40 | 37.8 | 105.6 |
| " | | 60 | 40.2 | 100.4 |
| " | | 240 | 49.5 | 54.3 |
| 13 | 1300 | 3 | 35.0 | 120.3 |
| " | | 5 | 33.8 | 130.2 |
| " | | 10 | 33.2 | 141.6 |
| " | | 20 | 37.6 | 108.4 |
| " | | 60 | 47.3 | 65.2 |
| " | 1500 | 3 | 35.0 | 117.6 |
| " | | 5 | 37.6 | 109.3 |
| " | | 10 | 46.5 | 61.3 |
| " | | 40 | 53.7 | 50.3 |
| " | 1800 | 3 | 44.3 | 73.5 |
| " | | 10 | 49.3 | 58.6 |
| " | | 60 | 65.4 | 40.3 |
| 14 | not annealed | | 46.8 | 61.4 |
| " | 1200 | 10 | 43.3 | 75.6 |
| 15 | not annealed | | 40.3 | 90.8 |
| " | | 3 | 38.7 | 95.3 |
| " | | 10 | 36.8 | 109.8 |
| " | | 20 | 34.8 | 115.6 |
| " | | 40 | 34.5 | 118.6 |
| " | | 60 | 38.5 | 98.3 |
| " | | 240 | 46.3 | 63.4 |
| " | 1100 | 3 | 38.1 | 102.4 |
| " | | 5 | 36.8 | 108.9 |
| " | | 10 | 35.3 | 118.4 |
| " | | 20 | 34.0 | 128.5 |
| " | | 40 | 36.3 | 109.4 |
| " | | 60 | 40.2 | 93.5 |
| " | | 240 | 48.5 | 53.9 |
| " | 1200 | 3 | 35.8 | 115.9 |
| " | | 5 | 35.7 | 120.6 |
| " | | 10 | 33.5 | 130.2 |
| " | | 20 | 33.9 | 135.6 |
| " | | 40 | 39.3 | 90.4 |
| " | 1300 | 3 | 34.0 | 128.4 |
| " | | 5 | 33.6 | 137.4 |
| " | | 10 | 35.2 | 121.3 |
| " | | 20 | 38.4 | 100.8 |
| " | | 120 | 54.3 | 50.0 |
| 15 | 1500 | 3 | 34.8 | 115.2 |
| " | | 5 | 39.2 | 90.0 |
| " | | 10 | 44.6 | 71.5 |
| " | | 40 | 54.3 | 50.6 |
| " | | 240 | 63.4 | 42.5 |
| " | 1800 | 3 | 46.5 | 59.3 |
| " | | 10 | 49.1 | 55.3 |
| " | | 20 | 57.3 | 50.2 |
| " | | 240 | 67.8 | 39.5 |

The RDA of the annealed materials showed that those materials which were sufficiently annealed (for example, for 10 minutes at 1200° C.) contained no traceable amounts of $Al_4C_3$. Furthermore, the phase $Al_4O_4C$ was more prevalent and the proportion of the $Al_2OC$-phase was smaller. As the heat treatment time was lengthened, particularly at higher temperatures (above 1200° C.), any Mg-Al-O-phase present in the product decreased substantially.

EXAMPLE 17

A mixture of 150 kg of calcined argillaceous earth (pure clay) containing 0.35%, by weight, of $Na_2O$, 3.1 kg of zirconium oxide and 7 kg of milled coke (C) was melted in the manner described in Example 1 and the melt was cast in a mold with a plate distance of 5-7 mm. The solidified product contained, by weight, 0.91% C, 2.06% $ZrO_2$ and less than 0.02% $Na_2O$. The material was milled and classified, and only the grain tenacity and the grinding efficiency index of grain P 36 (FEPA-norm) was determined before and after heat treatment (10 min./1200° C.). Since the zirconium was present in the product primarily in the form of carbide or oxycarbide and sub-oxide, the heat treatment had to be effected partially in an inert atmosphere to prevent their strong oxidation.

The RDA showed that the product was comprised of alpha-alumina, $Al_2OC$ and zirconium carbide. No sub-oxides and $Al_4C_3$ could be traced. The heat treatment did not substantially change the structure of the product, except for the appearance of a minor $Al_4O_4C$-phase.

The results are indicated in the following Table 5.

TABLE 5

|  | Wt. % grain decomposition | Grinding efficiency index |
|---|---|---|
| Grain P 36 not annealed | 38.4 | 101.6 |
| Grain P 36 (Ex. 8) annealed | 36.3 | 110.4 |

EXAMPLE 18

One hundred and fifty kilogram of calcined argillaceous earth (pure clay), 3 kg of SE-oxide and 7 kg of milled coke were mixed and melted in an electric arc furnace. The melt was cast in a mold with a plate distance of 5-7 mm. The solidified product contained, by weight, 0.88% C, 2.1% SE-oxide and less than 0.02% $Na_2O$. It was comminuted, classified and the grain decomposition and the grinding efficiency index was again determined from grain P 36 before and after heat treatment for 10 minutes at 1200° C.

The RDA showed the non-annealed product to be comprised of alpha-alumina, $Al_2OC$ and a phase which could not be defined specifically. No $Al_4C_3$ could be traced. Annealing produced a minor $Al_4O_4C$-phase.

The results are shown in Table 6.

TABLE 6

|  | Wt. % grain decomposition | Grinding efficiency index |
|---|---|---|
| Grain P 36 not annealed | 39.8 | 92.5 |
| Grain P 36 (Ex. 8) annealed | 35.4 | 115.6 |

EXAMPLE 19

One hundred and ten kilogram of calcined argillaceous earth (pure clay) containing 0.35%, by weight, of $Na_2O$, 1.5 kg of MgO and 28 kg of pulverized $Al_4C_3$ were well mixed and melted in an electric arc furnace. The melt was cooled as in Example 1. The product contained, by weight, 0.83% C, 1.1% MgO and less than 0.02% $Na_2O$. Again, the resultant grain P 36 was tested for grain decomposition and grinding efficiency index before and after heating for 10 minutes at 1200° C. The RDA showed that the non-annealed grain was comprised of alpha-alumina, $MgO.13Al_2O_3$, Mg-Al-O and $Al_2OC$. Heating caused the Mg-Al-O-phase to be decreased a little while some $Al_4O_4C$ appeared.

Table 7 shows the test results.

TABLE 7

|  | Wt. % grain decomposition | Grinding efficiency index |
|---|---|---|
| Grain P 36 not annealed | 41.8 | 75.6 |
| Grain P 36 (Ex. 8) annealed | 33.9 | 127.8 |

EXAMPLE 20

One hundred and thirty-five kilograms of calcined argillaceous earth (pure clay) containing 0.35%, by weight, of $Na_2O$, 8 kg of Al-sand, 1.8 kg of Mg-sand and 7 kg of milled coke (C) were mixed, the mixture was melted and rapidly cooled. The product contained, by weight, 2.01% MgO, 1.89% C and less than 0.02% $Na_2O$. The product was milled and classified, and the resultant P 36 grain was again tested for grain decomposition and the grinding efficiency index before and after the same heat treatment as above. The RDA showed the non-annealed product to be comprised of alpha-alumina, $MgO.13Al_2O_3$, $Al_2OC$, $Al_4O_4C$ and about 1-2%, by weight, of $Al_4C_3$. The latter disappeared during the heat treatment and the proportion of $Al_2OC$ to $Al_4O_4C$ changed in favor of the latter.

Table 8 shows the test results.

TABLE 8

|  | Wt. % grain decomposition | Grinding efficiency index |
|---|---|---|
| Grain P 36 not annealed | 39.5 | 95.6 |
| Grain P 36 (Ex. 8) annealed | 34.9 | 120.6 |

EXAMPLE 21

To improve the bonding qualities of grain P 36 obtained in Example 10 in the synthetic resin base on the grinding band, the grains were coated. Various types of coatings were applied, the coating being effected in the following manner:

After the abrasive grains were wetted with an adhesive medium (waterglass, colloidal silica, starch, etc.) in an agitator, the coating itself was applied, care being taken that the grains were completely enveloped in the coating. Subsequently, the coating was sintered to obtain a large surface structure and good adherence. If the sintering of the coating required a temperature of about 1200° C., the heat treatment and the sintering was effected in a single operating stage. If the sintering temperatures were lower, the grains were annealed before the coating.

Different types of coatings are shown in the following Table:

|  | Adhesive Medium | Coating Material | Sintering °C. |
|---|---|---|---|
| 19.1 | Waterglass | $Fe_2O_3$ | 800 |
| 19.2 | Colloidal silica | CaO | 1200 |
| 19.3 | " | $ZrO_2.SiO_2$ | 1200 |
| 19.4 | Starch | Feldspar | 1200 |

The following Table 9 shows the grain decomposition and grinding efficiency index of the coated abrasive grains produced in the above manner. Any increased grain tenacity results from the sealing of cracks produced by comminution by the penetrating adhesive medium.

TABLE 9

| Abrasive Medium | Wt. % grain decomposition | Grinding efficiency index |
| --- | --- | --- |
| 19.1 | 32.4 | 175.6 |
| 19.2 | 30.5 | 185.3 |
| 19.3 | 30.1 | 191.1 |
| 19.4 | 32.0 | 174.8 |

The results of the Examples given hereinabove show clearly that the grinding medium produced by the method of the present invention has extraordinary grain tenacity and an excellent grinding efficiency. These properties are expressed in a low grain decomposition and a high grinding efficiency index.

What is claimed is:

1. A method of producing a grinding medium consisting essentially of alpha-alumina, $Al_2OC$ and $Al_4O_4C$, which comprises the steps of
   (a) melting a mixture of a raw material selected from the group consisting of alumina and a material rich in alumina with a carbon-containing reducing agent to obtain a melt,
   (b) cooling the melt at a speed of more than 100° C. per minute to obtain a solidified body,
   (c) breaking the solidified body into abrasive grains, and
   (d) subjecting the abrasive grains to a heat treatment at a temperature of between 500° C. and 1500° C. for a period of three minutes to 24 hours until their $Al_4C_3$-content is less than 5%, by weight, said heat treatment being limited to a maximum period of ten minutes when said temperature is 1500° C.

2. The method of claim 1, wherein the mixture further comprises a metallic reducing agent.

3. The method of claim 2, wherein the metallic reducing agent is selected from the group consisting of magnesium and aluminum.

4. The method of claim 1, further comprising the step of adding to the mixture 0.1-10%, by weight, of at least one additive selected from the group consisting of magnesium, calcium, zirconium, titanium, silicon, chromium and a rare earth.

5. The method of claim 1, wherein the abrasive grains are surface-coated with at least one substance selected from the group consisting of silicates, pulverulent corundum, and iron oxides.

6. The method of claim 5, wherein the abrasive grains are surface-coated before the heat treatment.

7. The method of claim 5, wherein the abrasive grains are surface-coated after the heat treatment.

8. The method of claim 1, wherein the abrasive grains are subjected to the heat treatment at a temperature between 1000° C. and 1300° C. for a period of 5 to 60 minutes.

9. The method of claim 1, wherein the carbon-containing reducing agent is selected from the group consisting of coke, carbon black, graphite, anthracite and amorphous carbon.

10. The method of claim 1, wherein the carbon-containing reducing agent is a carbide.

11. The method of claim 10, wherein the carbide is $Al_4C_3$.

12. The method of claim 1, wherein the $Al_4C_3$-content is less than 0.5%, by weight.

13. The method of claim 1, wherein the carbon content of the mixture is between 0.1 and 6.6%, by weight.

* * * * *